(12) United States Patent
Ferencz, Jr.

(10) Patent No.: US 12,642,192 B1
(45) Date of Patent: Jun. 2, 2026

(54) POTTED PLANT EARTH BONDING

(71) Applicant: John Grover Ferencz, Jr., Brighton, MI (US)

(72) Inventor: John Grover Ferencz, Jr., Brighton, MI (US)

( * ) Notice: Subject to any disclaimer, the term of this patent is extended or adjusted under 35 U.S.C. 154(b) by 0 days.

(21) Appl. No.: 18/943,101

(22) Filed: Nov. 11, 2024

(51) Int. Cl.
 A01G 7/04 (2006.01)
 A01G 9/26 (2006.01)

(52) U.S. Cl.
 CPC ................. A01G 7/04 (2013.01); A01G 9/26 (2013.01)

(58) Field of Classification Search
 CPC ..................................... A01G 7/04; A01G 9/26
 See application file for complete search history.

(56) References Cited

U.S. PATENT DOCUMENTS

| | | | |
|---|---|---|---|
| 784,346 A * | 3/1905 | Pilsoudsky et al. ......................... A01M 21/046 |
| | | | 47/1.3 |
| 5,464,456 A * | 11/1995 | Kertz ....................... A47G 7/02 |
| | | | 47/60 |
| 5,819,467 A * | 10/1998 | Zucker ..................... A01G 7/04 |
| | | | 47/60 |

| | | | |
|---|---|---|---|
| 8,819,988 B2 * | 9/2014 | Corsi ........................ A01G 7/04 |
| | | | 47/1.3 |
| 2007/0266624 A1 * | 11/2007 | Tanaka ..................... A01G 7/04 |
| | | | 47/1.3 |
| 2014/0020294 A1 * | 1/2014 | Dunning .................. A01G 7/04 |
| | | | 47/1.3 |
| 2017/0202158 A1 * | 7/2017 | Kochman ................ A01G 9/24 |
| 2017/0223935 A1 * | 8/2017 | Behrens ............. B65D 81/3823 |
| 2024/0008417 A1 * | 1/2024 | Cordova ................... G05F 1/10 |

FOREIGN PATENT DOCUMENTS

KR 20160021382 A * 2/2016 ........... A01G 9/0293

* cited by examiner

*Primary Examiner* — Monica L Perry

(57) ABSTRACT

A potted plant grounding system that employs conductive wire and grounding rods to establish a stable electrical ground for indoor plants is disclosed. The system is intended for environments where traditional grounding is inaccessible such as in a potted plant using a non-conductive container, the system uses a conductive wire attached to a metal rod embedded in the plant's soil, connecting to a grounded source, such as an outlet or grounding rod. The rod transfers excess electrical charge from the plant to the ground, maintaining a balanced charge that benefits plant health by simulating natural outdoor grounding conditions. This approach helps reduce electrical stress on indoor plants caused by artificial environments, potentially enhancing plant growth and resilience. This grounding system offers a practical solution for plant care enthusiasts, particularly in urban and indoor settings.

20 Claims, 15 Drawing Sheets

POTTED PLANT EARTH BONDING

BACKGROUND OF THE DISCLOSURE

Potted plants, particularly those located indoors but also including outdoor potted plants, differ from those planted in the ground—they lack a connection to the earth. Most potted plants are placed inside container (e.g., pots, vases, etc.) that isolate and insulate the plants contained within from the earth and its grounding properties.

Whether the potted plants are installed in plastic, ceramic, wood, or glass containers (pots), these vessels either intentionally or unintentionally isolate the potted plants contained within and create an unnatural situation.

In a natural situation, a plant (e.g., flower, vegetable, tree, shrub, etc.) is planted in the ground that is part of the earth—a farm field, for example. Thus, the plant has an earth bond due to its placement in the earth. As a result, the plant can receive all the benefits of being planted in the earth that plants have done for millennia and have evolved to expect.

When a plant is placed inside a pot, whether it is indoors or outdoors, that plant is electrically isolated or disconnected from a connection to the earth. Since that plant is in an alien situation, it's growth and development is stunted and it cannot obtain its true potential without a means to be connected to the earth.

The potted plant grounding system of the present disclosure employs conductive wire and grounding rods to establish a stable electrical ground for indoor plants or plants in non-conductive containers. The system is intended for environments where traditional grounding is inaccessible such as in a potted plant using a non-conductive container. The system uses a conductive wire attached to a metal rod embedded in the plant's soil, connected to a grounded source, such as an outlet or grounding rod. The rod transfers excess electrical charge from the plant to the ground, maintains a balanced charge that benefits plant health by simulating natural outdoor grounding conditions. This approach helps reduce electrical stress on indoor plants caused by artificial environments, potentially enhancing plant growth and resilience. This grounding system offers a practical solution for plant care enthusiasts, particularly in urban and indoor settings.

SUMMARY OF THE DISCLOSURE

The present disclosure over the problems and disadvantages associated with the current strategies and designs and provides new tools and methods to bond a potted plant to the earth.

One embodiment of the present disclosure is directed to a system to connect a potted plant to the earth, the system including a conductive rod, where the conductive rod is placed in soil surrounding a plant in a non-conductive pot, a wire electrically connected on a first end to the conductive rod and on a second end to an electrical outlet adapter, where the electrical outlet adapter is selectively engaged via the electrical ground with an electrical outlet that is connected to mains power, where the mains power includes a ground connection to electrically conduct negative electrons through the electrical outlet adapter, through the wire, and through the conductive rod to the plant in the soil contained by the non-conductive pot.

Another embodiment of the present disclosure is directed to a system to connect a potted plant to the earth, the system including a conductive rod that is constructed of at least one of copper, aluminum, or alloys of copper or aluminum.

Another embodiment of the present disclosure is directed to a system to connect a potted plant to the earth, the system including a conductive rod further including an electrical connector for selective connection with the wire.

Another embodiment of the present disclosure is directed to a system to connect a potted plant to the earth, the system including a wire further including connectors on the first end and the second end that are selectively connectable to the conductive rod and the electrical outlet adapter.

Another embodiment of the present disclosure is directed to a system to connect a potted plant to the earth, the system including an electrical outlet adapter further including a first connector for receiving the wire with a connector, where the first connector is electrically connected through the electrical outlet adapter, to a conductive outlet connection that engages the electrical outlet.

Another embodiment of the present disclosure is directed to a system to connect a potted plant to the earth, the system including a pair of non-conductive outlet guides to engage a first neutral terminal and a second black terminal of the electrical outlet.

Another embodiment of the present disclosure is directed to a system to connect a potted plant to the earth, the system including a multi-tap connector, where the multi-tap connector joins a plurality of conductive rods with a single electrical connection to the electrical outlet adapter.

Another embodiment of the present disclosure is directed to a system to connect a potted plant to the earth, the system including at least one conductive plate, where the conductive plate is placed in soil surrounding a plant in a non-conductive pot, a wire electrically connected on a first end to the at least one conductive plate and on a second end to an electrical outlet adapter, where the electrical outlet adapter is selectively engaged via the electrical ground with an electrical outlet that is connected to mains power, where the mains power includes a ground connection to electrically conduct negative electrons through the electrical outlet adapter, through the wire, and through the conductive rod to the plant in the soil contained by the non-conductive pot.

Another embodiment of the present disclosure is directed to a system to connect a potted plant to the earth, the system including a conductive plate that is constructed of at least one of copper, aluminum, or alloys of copper or aluminum.

Another embodiment of the present disclosure is directed to a system to connect a potted plant to the earth, the system including a conductive plate that is electrically connected to a wire using a fusible metal alloy.

Another embodiment of the present disclosure is directed to a system to connect a potted plant to the earth, the system including a wire further includes connectors on the first end and the second end that are selectively connectable to the conductive rod and the electrical outlet adapter.

Another embodiment of the present disclosure is directed to a system to connect a potted plant to the earth, the system including an electrical outlet adapter that further includes a first connector for receiving the wire with a connector, where the first connector is electrically connected through the electrical outlet adapter, to a conductive outlet connection that engages the electrical outlet.

Another embodiment of the present disclosure is directed to a system to connect a potted plant to the earth, the system including a pair of non-conductive outlet guides to engage a first neutral terminal and a second black terminal of the electrical outlet.

Another embodiment of the present disclosure is directed to a system to connect a potted plant to the earth, the system including a multi-tap connector, where the multi-tap connector joins a plurality of conductive rods with a single electrical connection to the electrical outlet adapter.

Another embodiment of the present disclosure is directed to a system to connect a potted plant to the earth, the system including a conductive rod, where the conductive rod is placed in the earth, an electrical connector, wherein the electrical connector joins a plurality of wires in electrical communication with the conductive rod, a first wire in electrical connection with a plurality of conductive plates, where the conductive plates are disposed in the soil of a first potted plant, a multi-tap connector, where the multi-tap connector is electrically connected to the conductive rod by the electrical connector, and where the multi-tap connector further comprises a plurality of wire taps, where the wire taps are electrically connected to a plurality of sets of conductive plates disposed in the soil of a second and a third potted plant by a second wire and a third wire.

Another embodiment of the present disclosure is directed to a system to connect a potted plant to the earth, the system including a conductive plate that is constructed of at least one of copper, aluminum, or alloys of copper or aluminum.

Another embodiment of the present disclosure is directed to a system to connect a potted plant to the earth, the system including a conductive plate that is electrically connected to a wire using a fusible metal alloy.

Another embodiment of the present disclosure is directed to a system to connect a potted plant to the earth, the system including a wire that further includes connectors on the first end and the second end that are selectively connectable to the conductive rod and the electrical outlet adapter.

Another embodiment of the present disclosure is directed to a system to connect a potted plant to the earth, the system including a second wire and a third wire that further comprise selectively detachable connectors that engages selectively detachable connectors on the multi-tap connector.

Another embodiment of the present disclosure is directed to a system to connect a potted plant to the earth, the system including a first, second, and third wires that include an insulated covering over at least a portion of the lengths of the first, second, and third wires.

Other embodiments and advantages of the disclosure are set forth in the part in the description and accompanying drawings, which follow and are included herein, respectively, and in part, may be obvious from this description and accompanying drawings, or may be learned from practice of the disclosure.

BRIEF DESCRIPTION OF DRAWINGS

The disclosure is described in greater detail by way of the example only and with referenced to the attached drawings, in which:

FIG. 16 is group of exemplary views of components of the system according to an embodiment of the present disclosure.

DETAILED DESCRIPTION OF THE DISCLOSURE

Figure 1:
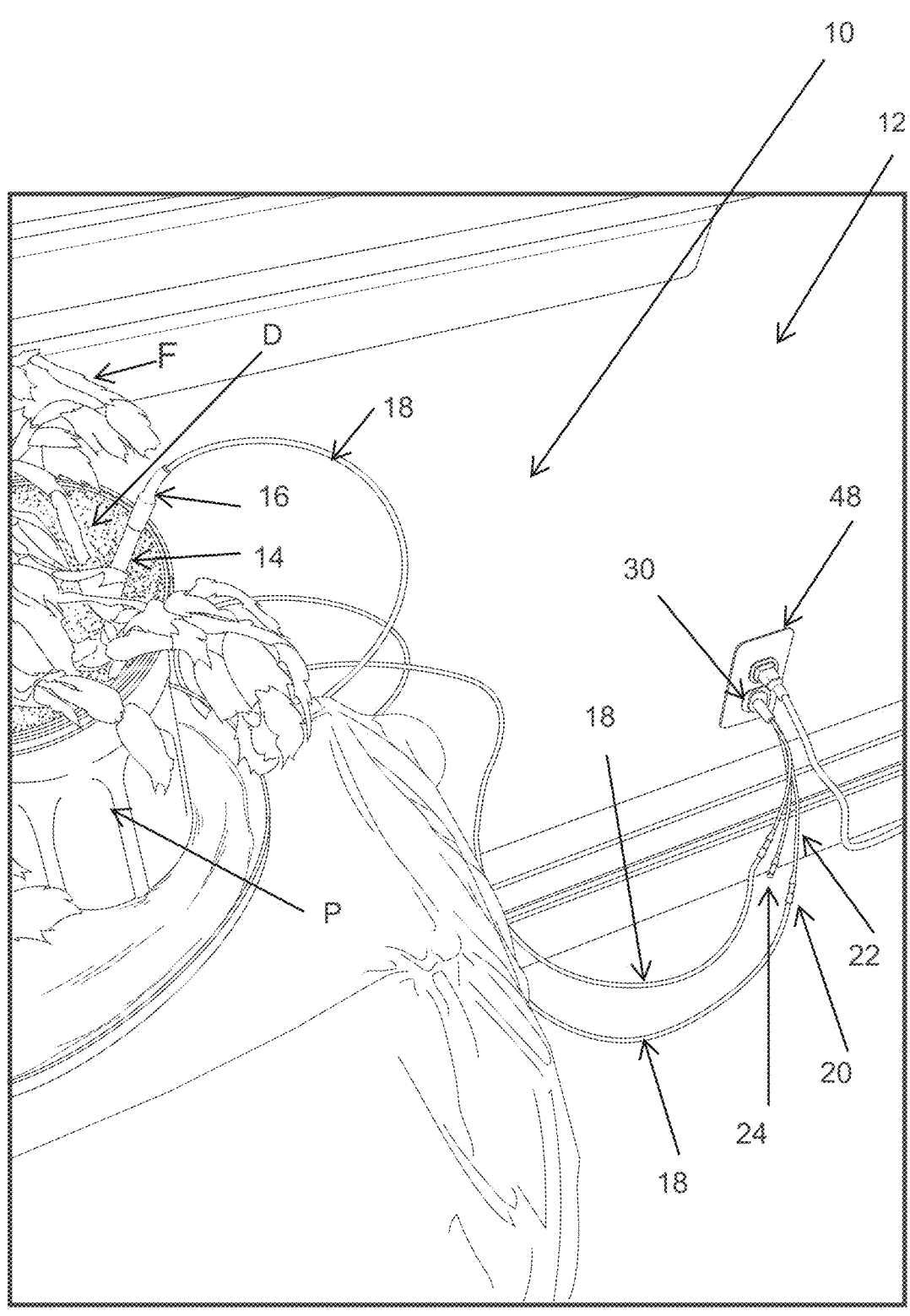
FIG. 1 is an exemplary view of an embodiment of the present disclosure.

As embodied and broadly described here in the Drawings, the present disclosure is directed to a system of bonding potted plants to the earth.

One objective of the present disclosure is to bond potted plants to the earth to replicate the electrical connection that plants growing in the earth have, to improve their growth rate, create stronger and healthier plants, and to minimize the use of chemicals and other non-natural substances in the environment. Many plant containers are non-conductive (plastic or clay) so plants contained within are isolated from the earth that they are accustomed to being planted in. In effect, the plants in pots without the present disclosure are marooned and left in an unnatural or synthetic state. When the plants don't grow as planned, people turn to chemicals such as fertilizers to try to remedy the situation. Currently there is a need to avoid the use of chemicals, particularly with those plants that are grown to be eaten, but also plants that are grown for decoration or other uses. The system of the present disclosure replicates as nearly as possible to a planting in the earth, to allow the plant (flower, fruit, or tree) to re-establish the connection with the earth that it would receive if it were planted directly in the earth.

By electrically connecting a potted plant to the earth, to "bond" it to the earth electrically, the present disclosure brings earth's negatively charged electrons to the potted plant when equipped with the present disclosure, whether the potted plant is indoors or outdoors.

Using a conductive rod or plate, such as those made of copper, a wire is connected to the conductive rod or plate which is then connected to an electrical outlet. The wiring system connected to the electrical outlet includes a ground that then brings the earth's negatively charged electrons to the potted plant. No electricity is used by the present disclosure as both the neutral/white and black terminals are blocked with non-conductive material—only the ground is utilized thus there is no additional cost to the consumer.

The present disclosure may be configured for use with a single plant, several plants, or many plants. For example, a commercial nursery or growing operation, or greenhouse may use the present disclosure, or in other, smaller-scale situations, such as flowerboxes or potted plants at a home or a commercial setting.

In one embodiment of the present disclosure, the system is configured to include at least one potted plant. The pot used to contain the plant may be of a variety of materials, such as but not limited to polymers (plastics), ceramic, glass, or other suitable material(s). Typically, the materials used as pots for plants are non-conductive or minimally conductive. For example, plastic pots are generally not conductive while ceramic pots may also be generally non-conductive but their properties may be changed if they are wet (i.e., saturated with water), water being known as a conductor of electrical current.

A conductive rod, such as one constructed of copper (though other conductive materials and combinations of materials may be used, such as, but not limited to, aluminum, steel, iron, etc.) is inserted into the soil surrounding the plant contained in the pot. The rod may contact the root system of the plant, or over time the roots of the plant may grow around and contact the rod. At one end of the conductive rod, a wire is connected. The wire may be connected through a variety of electrically conductive means, including soldering (welding), through an electrical connector (such as a banana-type male-female connector), or another suitable connector.

The conductive rod may be, for example and without limitation, a 12-inch-long copper rod with a 0.25-inch diameter (30.48 cm long with 6.35 mm diameter). Copper is a known good conductor and is typically used in electrical circuits. One end of the conductive rod (rod) is inserted into the soil surrounding the potted plant, and the other end includes a length of wire that may be connected either through soldered connection or some other electrical connection as described herein and known in the art.

The wire connected to the conductive rod may be, for example and without limitation, 16-gauge machine tool wire (MTW). The wire may include an insulative covering or may be exposed wire. Machine tool wire is known in the art for its use in the wiring of machine tools, appliances, and the like. It is contemplated that other types of wire may be used, such as but not limited to, thermoplastic high heat-resistant nylon wire. The wire may include an electrical connector, such as a banana-type male-female connector located at the opposite end of the conductive rod. The wire may also include a banana-type connector at the end joined to the conductive rod (which may also have the corresponding banana-type connector.

The wire connected to the conductive rod at one end via a connector may also be connected at its other end to a ground connector. The ground connector may be configured to receive a banana-type connector (male-female) opposite the wire and may also be configured to engage an electrical outlet. The electrical outlet may be configured as a "three-prong" type, also referred to a grounding receptacle due to its having a grounding wire along with a "neutral" and a "hot" wire. The ground connector includes an electrical connection to the grounding wire outlet of the 3-prong electrical outlet, such that, when properly connected, the entire system of the present disclosure is electrically grounded through the electrical circuit of the outlet. By using the existing grounding system of the electrical outlet, the system of the present invention bonds the potted plant to the earth to replicate the natural condition of the plant being placed directly in the ground of the earth and receive all the included benefits thereof.

In another non-limiting exemplary embodiment of the present disclosure, a system to bond a plurality of potted plants to the earth is described. A conducting rod is placed into the dirt of a potted plant whereby the roots of the plant may come into direct or indirect contact with the rod. A wire may be connected securely to the rod via soldering or some other permanent connection type, or alternatively a connector such as a banana-type connector, may be installed one end of the rod (opposite the end placed into the dirt of pot) to receive another banana connector affixed to the wire, forming an electrical connection.

The wire may then be connected to a multi-tap receiver. The multi-tap receiver (MTR) may be configured with a plurality of wires joined together on one end and a single wire on the opposite end. In this way, a plurality of plants may be grounded to the earth using a single ground rod. The MTR is further configured with, for example, a plurality of banana-type connectors on one end to receive wires from a plurality of potted plants. On the other end, the MTR is further configured with a single banana-type connector, for example, to receive a wire from a ground rod placed into the earth. In other embodiments, the MTR may be directly connected to the ground rod, such as by soldering or other secure connection means to conduct electricity.

According to this embodiment, a plurality of plants may be grounded to the earth using the system of the present disclosure. For example, in a plant nursery or large-scale growing operation, many plants may be connected that are individually potted or communally potted via conducting rods placed in the plants' soil, joined electrically by the MTR, and then grounded to the earth via a single (or multiple grounding rods).

The following description refers generally to the Figures. Referring now to FIG. 1, an exemplary embodiment of the present disclosure is shown. Potted plant earth bonding system 10 is shown, in this embodiment in the interior of a living space, such as a bedroom or a living room, or an office. In an event, the living space 12 is shown in a climate-controlled area suitable for human habitation. As a result, a potted plant is not in contact with the earth and so its growth rate suffers due to this unnatural condition. Using system 10 alleviates this situation. A conductive rod 14 is disposed or located in the dirt D of a plant pot P. Conductive rod 14 may be constructed of a variety of materials, such as but not limited to conductive materials such as copper or aluminum. The size and shape of the conductive rod 14 may be 6 or 10 inches (15.25 cm-25.4 cm), for example and without limitation. The conductive rod 14 is terminated at one end with a conductive rod to wire connection 16. The connection 16 may be solder-type connection, though other electrically conductive connections are also contemplated. The connection 16 may include a protective cover, such as but not limited to, heat-shrink tubing, a protective coating, or other suitable covering to protect the wire connection 16 from the elements and wear and tear. Connected opposite the conductive rod 14 via the conductive rod to wire connection 16 is a length of wire 18. The wire 18 may be constructed of a conductive material, such as copper or aluminum, and may include a protective outer cover or sheathing. Wire 18 may also be electrically connected to the conductive rod 14 by the conductive rod to wire connection 16. Wire 18 may be, for example only, a 6 foot (182.8 cm) length of 16 gauge copper wire according to the American Wire Gauge (AWG) standard. It is contemplated that additional gauges of wires may be used, including but not limited to those of the AWG standard.

One or more wires 18 may extend from the wire connections 16 to terminate in, in one embodiment, male electrical connectors 20. Male electrical connectors 20 may be of a variety of shapes and sizes, including but not limited to, 4 mm RC cap male connectors. It should be understood that female connectors may also be used in this configuration. The male electrical connectors 20 may be electrically connected to the wires 18, such as by solder, welding, crimping, or other mechanical means, for example. Male electrical connectors 20 may be configured to be permanently or semi-permanently connected that allows users to selectively remove or disconnect the wires 18 from the multi-tap connector 22.

Multi-tap connector 22 may be configured with a plurality of wires, such as of the type used in wires 18, though it is contemplated that the wires of multi-tap connector 22 may be different. Multi-tap connector 22 may be configured with a plurality of electrical connectors including female connectors 24 similar to, and configured to receive, the male connectors 20 described above, such as 4 mm RC receiver connectors. The wires of multi-tap connector 22 may include a protective covering, such as those described for wires 18. The plurality of wires of multi-tap connector 22 are then joined together into a single wire in this embodiment, which is then electrically connected to a male electrical connector 20. The make electrical connector 20 of the multi-tap connector 22 may then be selectively connected to outlet adapter 30.

Figures 14, 15:
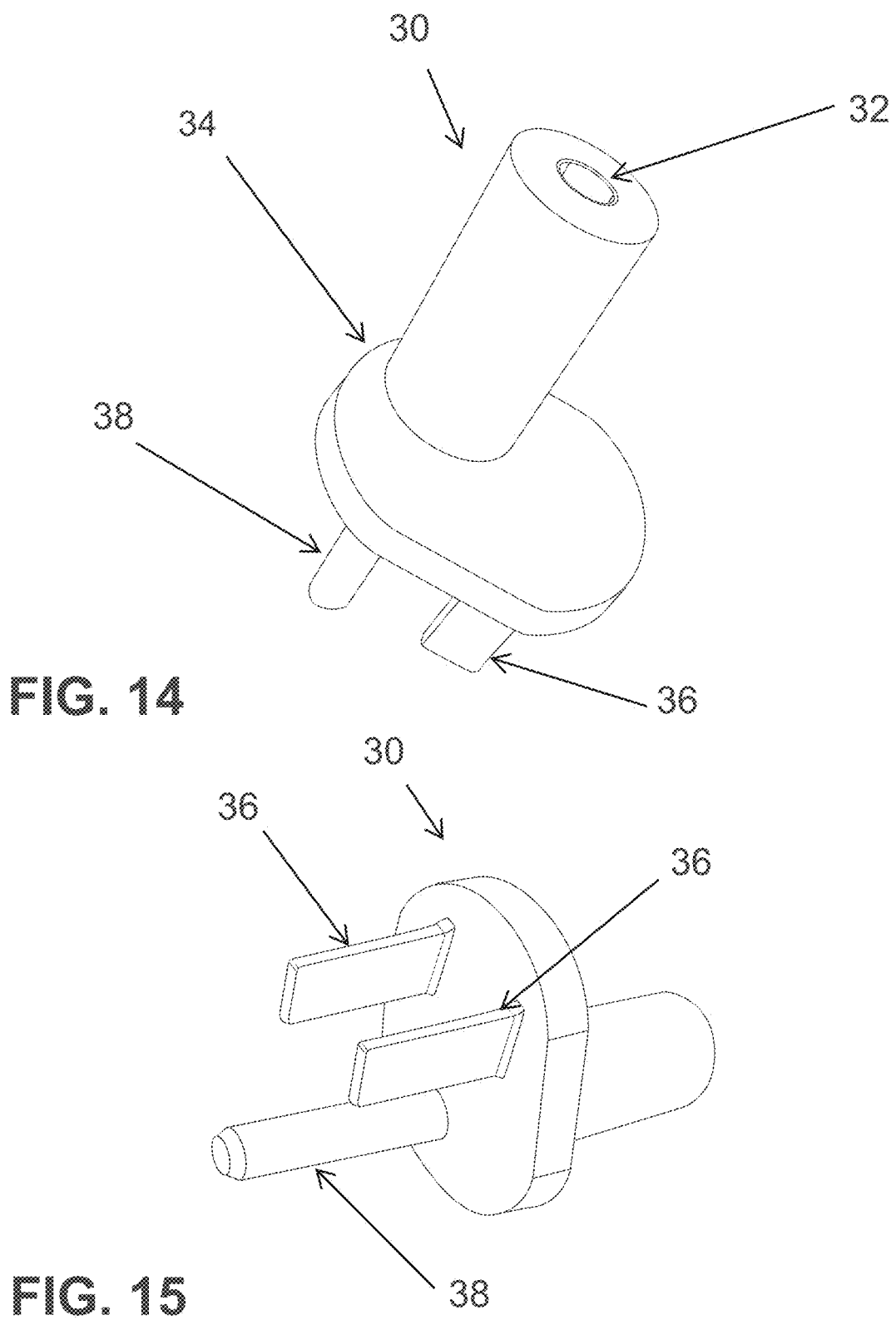
FIG. 14 is a side view of a component according to an embodiment of the present disclosure.
FIG. 15 is side view of the component shown in FIG. 14, according to an embodiment of the present disclosure.

Outlet adapter 30 may be configured to engage a three-prong National Electrical Manufacturers Association (NEMA) outlet. It should be understood that other outlets for distributing alternating current (AC) are contemplated for use with the present disclosure due to the variety of electrical standards around the world. The use of a NEMA outlet in this disclosure therefore should not be considered limiting, only exemplary in nature. Outlet adapter 30 may include the following components, as shown in FIGS. 14-15, for example. Outlet adapter 30 may include a female receiver 32, configured to receive male connector 20 of various elements of the system 10. For example, female receiver 32 may be configured to receive the male connector 20 of the multi-tap connector 22. In other embodiments, the outlet adapter 30 may be configured with a male receiver to engage a female connector 24. Outlet adapter 30 may also include outlet adapter body 34. Outlet adapter body 34 may be constructed of a polymer or other non-conductive material. On the opposite side of outlet adapter body 34 may be disposed a pair of non-conductive outlet guides 36. Non-conductive outlet guides 36 may be configured to engage the neutral/white and black connections of the typical NEMA outlet 48. Also, on the same side as the non-conductive outlet guides 36 is the conductive outlet connection 38. The conductive outlet connection 38 is in electrical connection with the female receiver 32 within outlet adapter 30. In this way, a conductive rod 14 located in dirt D may be electrically connected to an electrical system of a structure or living space 12 via wall outlet 48.

Figure 2:
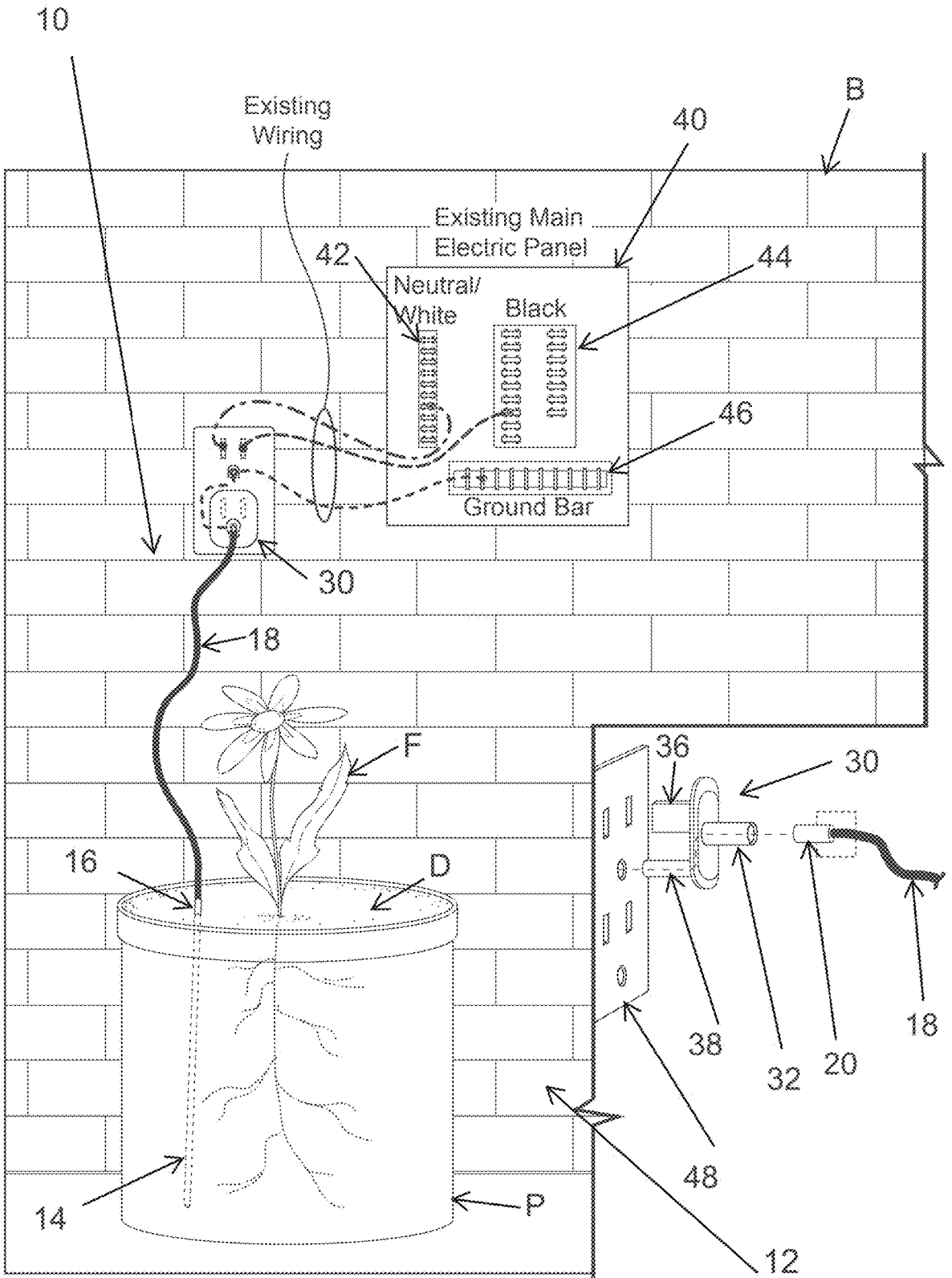
FIG. 2 is an exemplary view of an embodiment of the present disclosure.

FIG. 2 is another embodiment of the system 10 of the present disclosure. System 10 may be located within living space 12 of building B that includes electrical service. Conductive rod 14 may be disposed in the dirt D of a pot P containing a flower F. One end of the conductive rod 14 may include a wire connection 16 that is also electrically connected to a wire 18. Wire 18 may include a connector, either a male connector 20 or a female connector 24 that may engage the outlet adapter 30. Outlet adapter 30 may include the opposite connector of the wire 18 in this embodiment, such as female connector 32, which is electrically connected to the conductive outlet connector 38. Outlet connect 38 is then in electrical communication with the mains power panel 40 of the living space 12, and includes neutral/white circuit breakers/terminals 42, black circuit breakers/terminals 44, and ground bar terminals 46. In this configuration, the flower F is electrically connected via the system 10 to the mains power of the building B.

Figure 3:
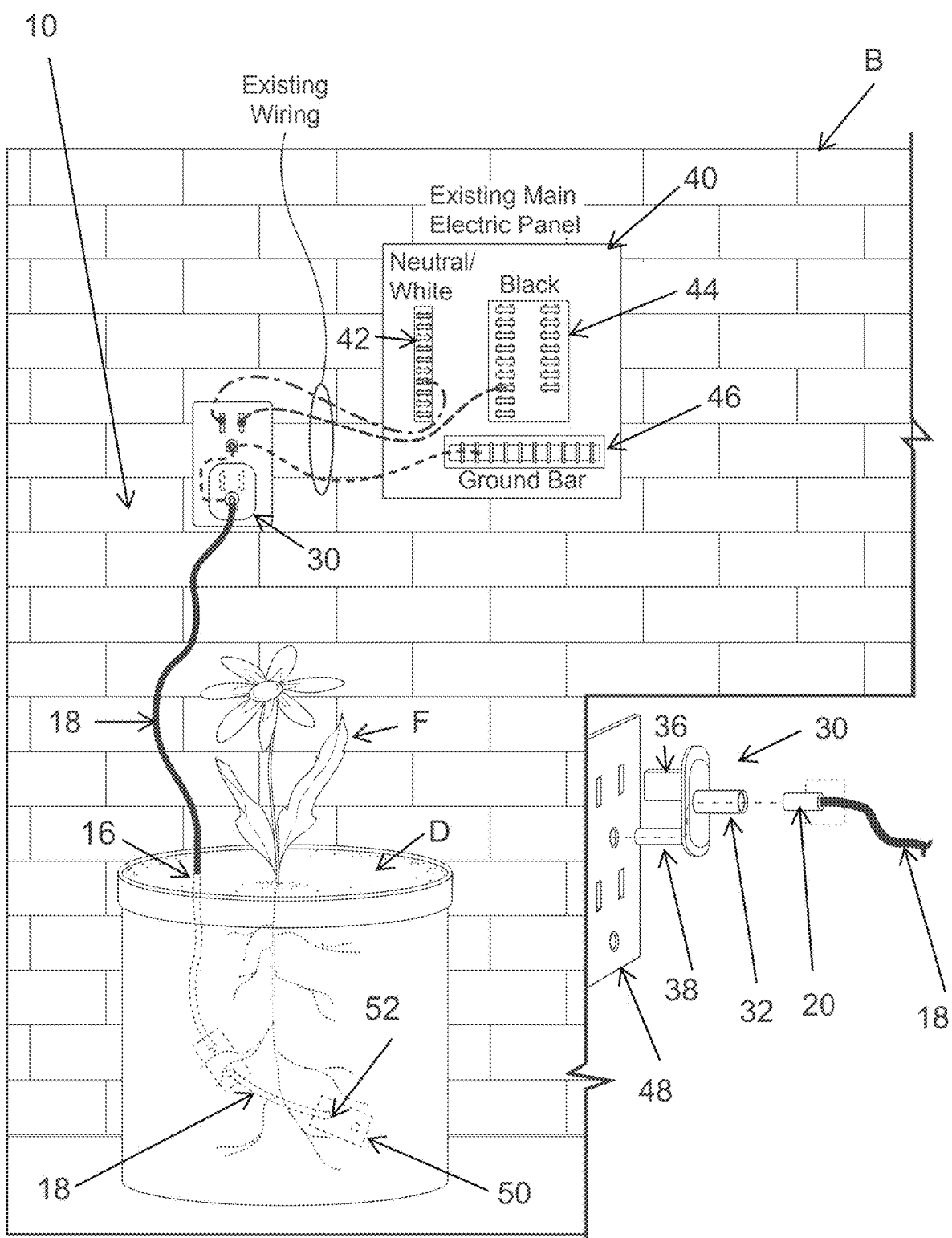
FIG. 3 is an exemplary view of an embodiment of the present disclosure.

Referring now to FIG. 3, another embodiment of the system 10 is shown. System 10 may be located within living space 12 of building B that includes electrical service. In the place of conductive rod 14 (as shown in FIG. 2, for example), at least one copper plates 50 may be disposed in the dirt D of a pot P containing a flower F. It should be understood that copper is but one conductive material that may used for plates 50 as well as other components of system 10 and its use in this description is exemplary and therefore not limiting. Copper plates 50 may be electrically connected via solder connections 52 to wire 18. One end of the wire 18 may include a wire connection 16 that is also electrically connected to a wire 18. Wire 18 may include a connector, either a male connector 20 or a female connector 24 that may engage the outlet adapter 30. Outlet adapter 30 may include the opposite connector of the wire 18 in this embodiment, such as female connector 32, which is electrically connected to the conductive outlet connector 38. Outlet connect 38 is then in electrical communication with the mains power panel 40 of the living space 12, and includes neutral/white circuit breakers/terminals 42, black circuit breakers/terminals 44, and ground bar terminals 46. In this configuration, the flower F is electrically connected via the system 10 to the mains power of the building B.

Figure 4:
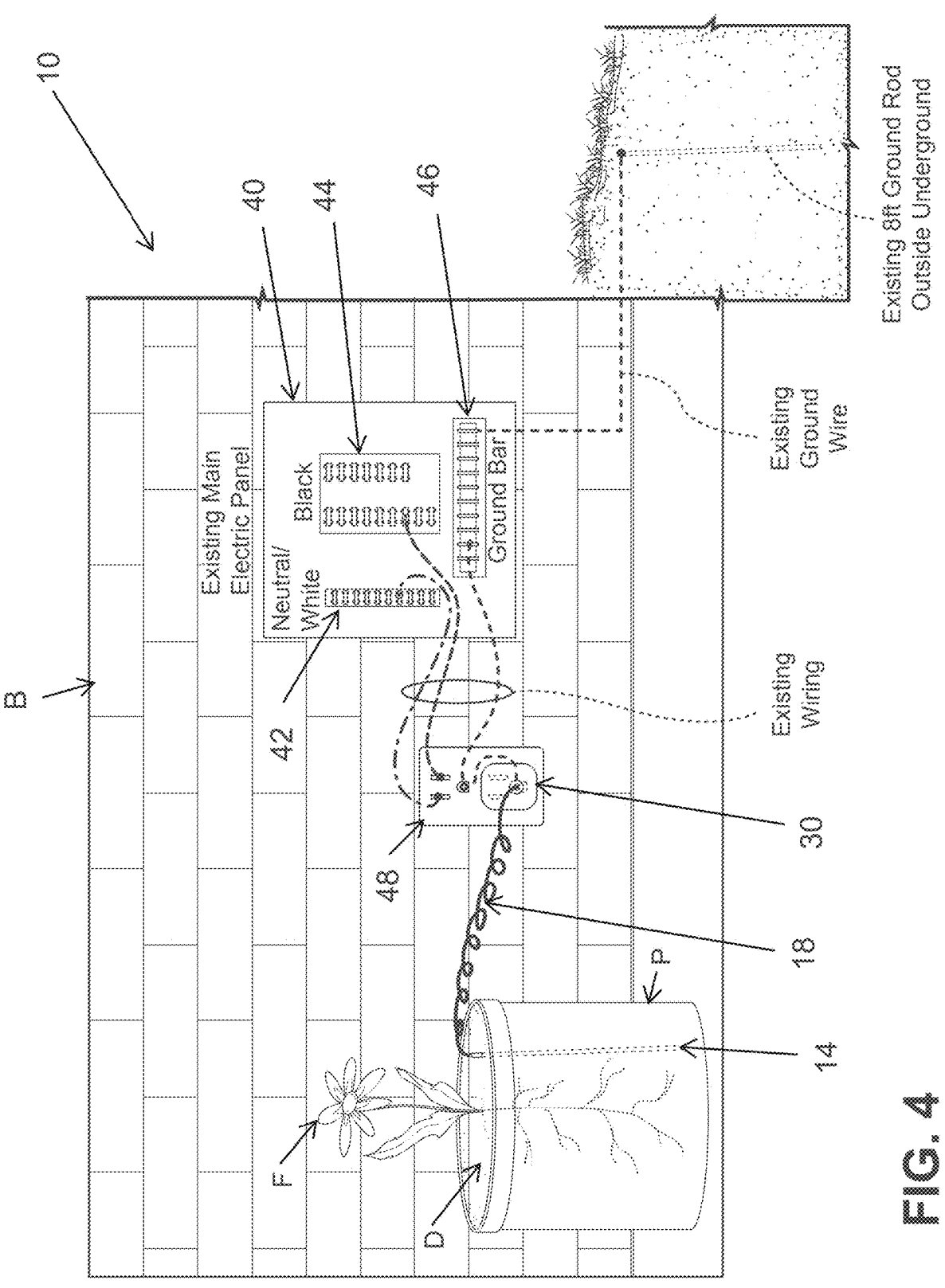
FIG. 4 is an exemplary view of an embodiment of the present disclosure.

Referring now to FIG. 4, another embodiment of the system 10 is shown. System 10 may be located within living space 12 of building B that includes electrical service. Conductive rod 14 may be disposed in the dirt D of a pot P containing a flower F. One end of the conductive rod 14 may include a wire connection 16 that is also electrically connected to a wire 18. Wire 18 may include a connector, either a male connector 20 or a female connector 24 that may engage the outlet adapter 30. Outlet adapter 30 may include the opposite connector of the wire 18 in this embodiment, such as female connector 32, which is electrically connected to the conductive outlet connector 38. Outlet connect 38 is then in electrical communication with the mains power panel 40 of the living space 12, and includes neutral/white circuit breakers/terminals 42, black circuit breakers/terminals 44, and ground bar terminals 46. Ground bar terminals 46 are further connected, using Existing Ground Wire in building B, to Existing Ground Rod of building B located in the earth. In this configuration, the flower F is electrically connected via the system 10 to the mains power of the building B.

Figure 5:
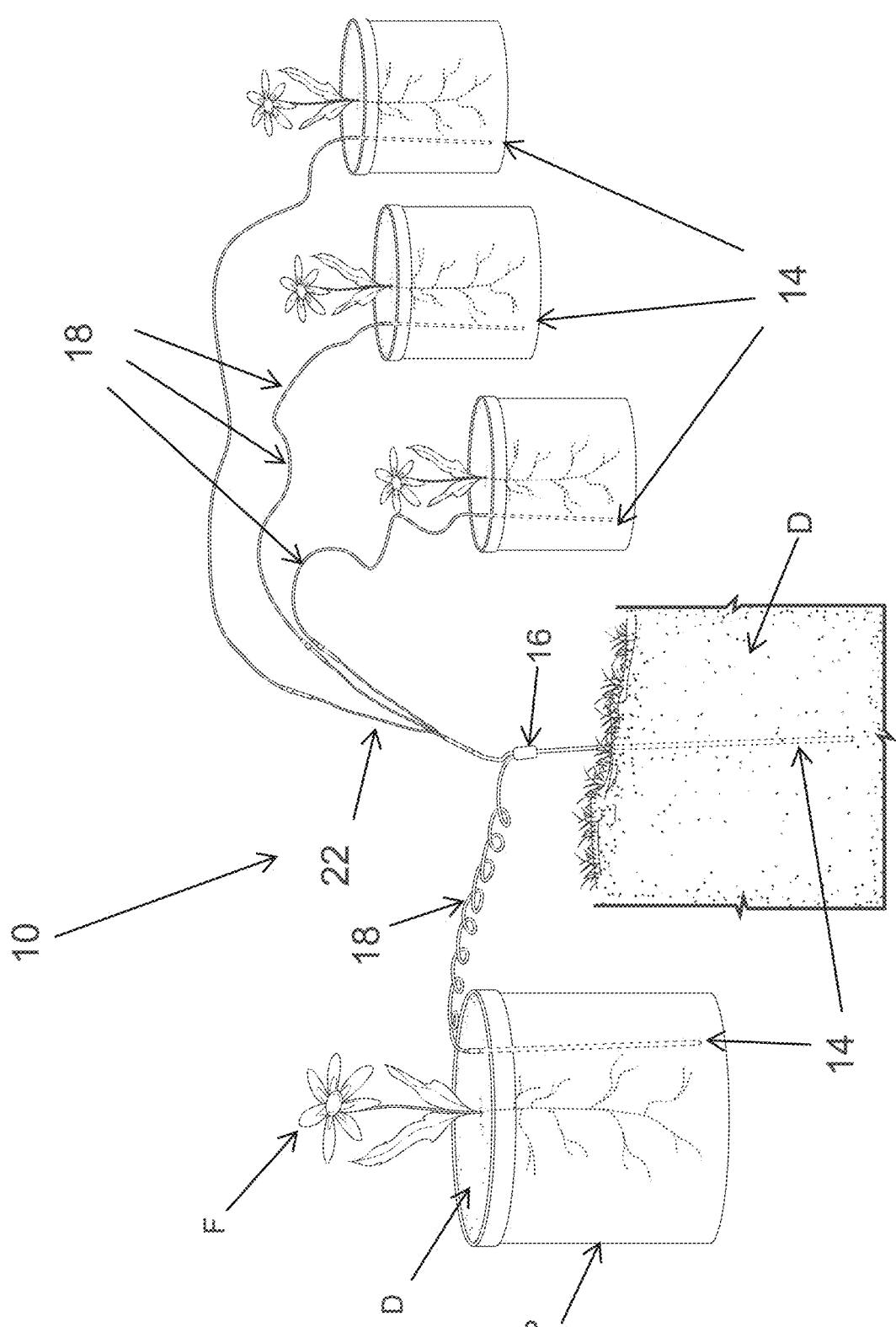
FIG. 5 is an exemplary view of an embodiment of the present disclosure.

Referring now to FIG. 5, another embodiment of the system 10 is shown. System 10 may be located outside (outdoors) of living space 12 of building B. In this embodiment, a plurality of potted plants, flowers F are shown disposed in dirt D located in pots P. For example, the plurality of potted plants could be located on a patio adjacent to a natural area containing dirt D in contact with the earth, such as a flowerbed. Conductive rods 14 may be disposed in the dirt D of each pot P, as well as the dirt D as part of the earth. Each conductive rod 14 includes a wire connection 16 that may be connected to a wire 18 and/or a multi-tap connector 22. In this way, a plurality of potted plants located in proximity to the dirt D of the earth, may be electrically bonded and grounded to the earth using an embodiment of system 10.

Figure 6:
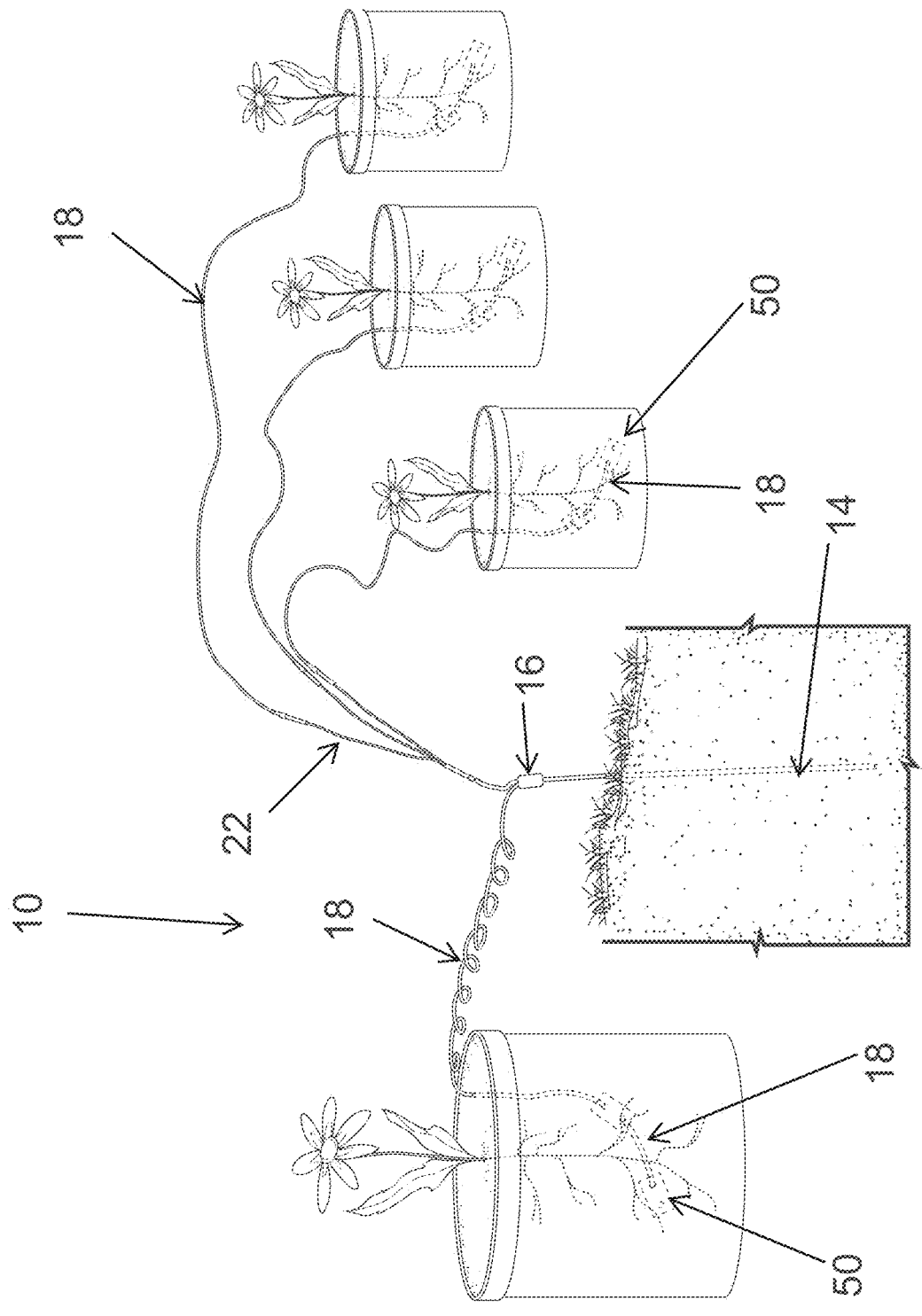
FIG. 6 is an exemplary view of an embodiment of the present disclosure.

Referring now to FIG. 6, another embodiment of the system 10 is shown. System 10 may be located outside (outdoors) of living space 12 of building B. In this embodiment, a plurality of potted plants, flowers F are shown disposed in dirt D located in pots P. For example, the plurality of potted plants could be located on a patio adjacent to a natural area containing dirt D in contact with the earth, such as a flowerbed. At least one plate 50, electrically connected to wire 18 may be disposed in the dirt D of each pot P, and a conductive rod 14 may be in contact with the dirt D as part of the earth. It should be understood that the conductive rod 14 may be replaced by plate(s) 50 in embodiment of the system 10. Each plate 50 includes a wire connection 16 that may be connected to a wire 18 and/or a multi-tap connector 22. In this way, a plurality of potted plants located in proximity to the dirt D of the earth, may be electrically bonded and grounded to the earth using an embodiment of system 10.

Figure 7:
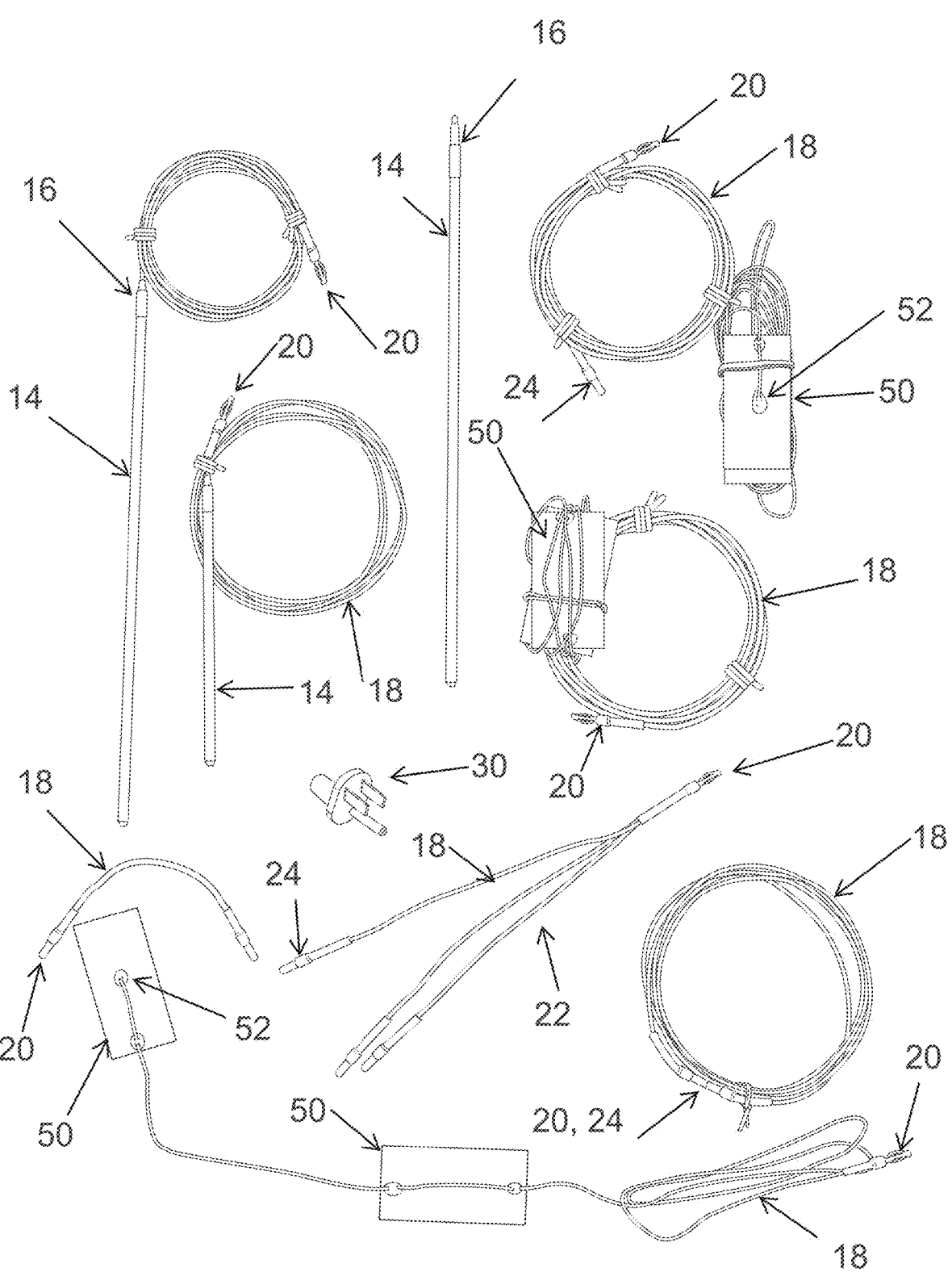
FIG. 7 is a top view of components of an embodiment of the present disclosure.

Referring now to FIG. 7, components of system 10 are shown. Starting at the upper center and moving clockwise is conductive rod 14 and wire connection 16. Plates 50 including electrical plate connections 52. Plate connections 52 joining the plates 50 to wires 18 which include male electrical connector 20 and female electrical connector 24. Another component includes plates 50 with plate connections 52 joined to wire 18 terminating in male connector 20. Multi-tap connector 22 includes a plurality of wires 18 including a plurality of female connectors 24, joined together to electrically connected with a male connector 20. A wire 18 may be configured with a male connector 20 on one end and female connector 24 on the opposite end. A pair of plates 50, in this embodiment, are shown joined to wire 18 by a plurality of plate connections 52. Another component of system 10 includes a length of wire 18, each end having a male connector 20 (though other embodiments may include different connector configurations). Outlet adapter 30 is also shown and is described herein. A pair of conductive rods 14 are shown with lengths of wire 18 joined to the conductive rods with wire connections 16 and terminated with, in this embodiment, male connectors 20.

Figure 8:
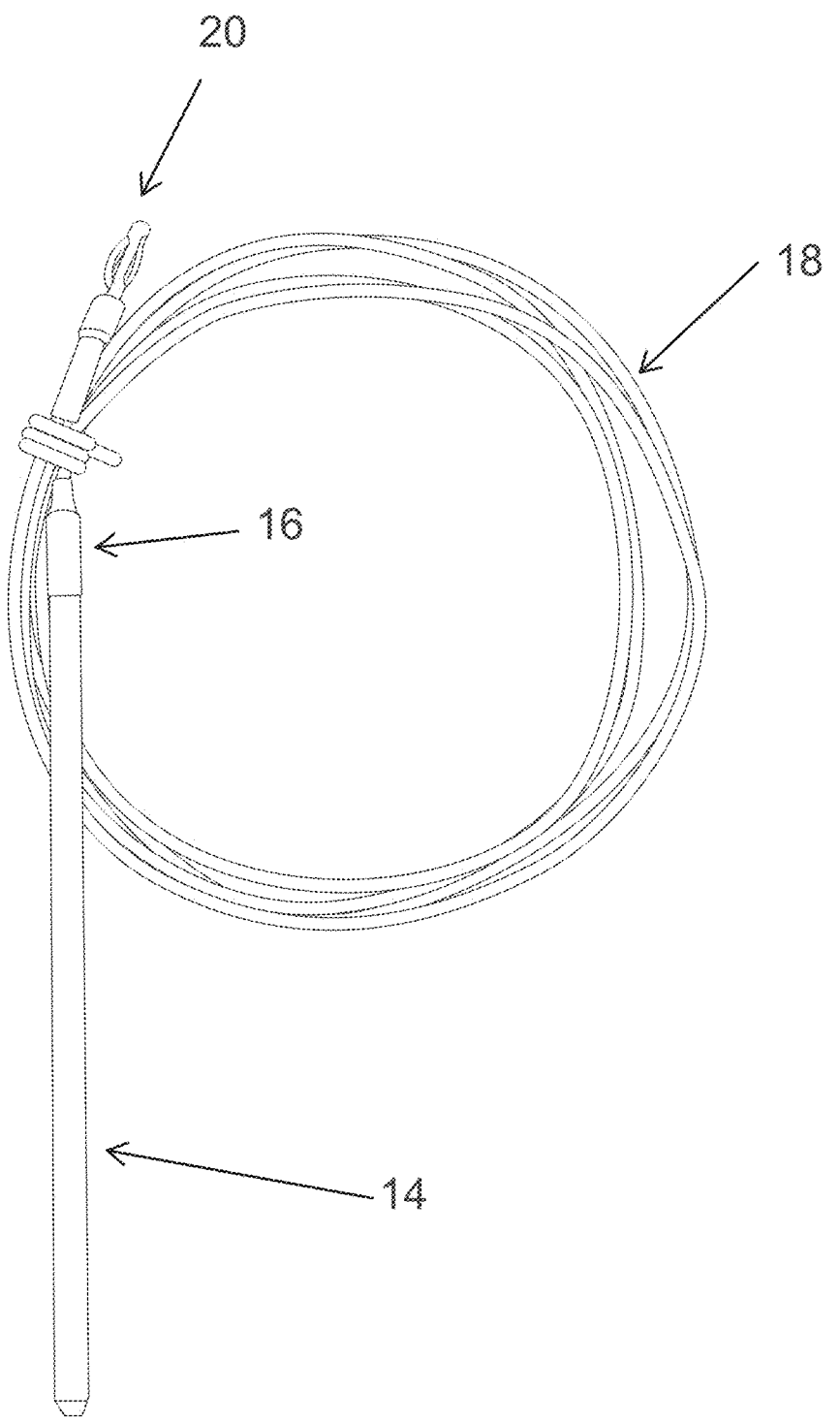
FIG. 8 is a top view of a component according to an embodiment of the present disclosure.

Referring now to FIG. 8, a component of system 10 is shown. Conductive rod 14 is shown electrically connected via wire connection 16 to wire 18, which is terminated with male connector 20.

Figure 9:
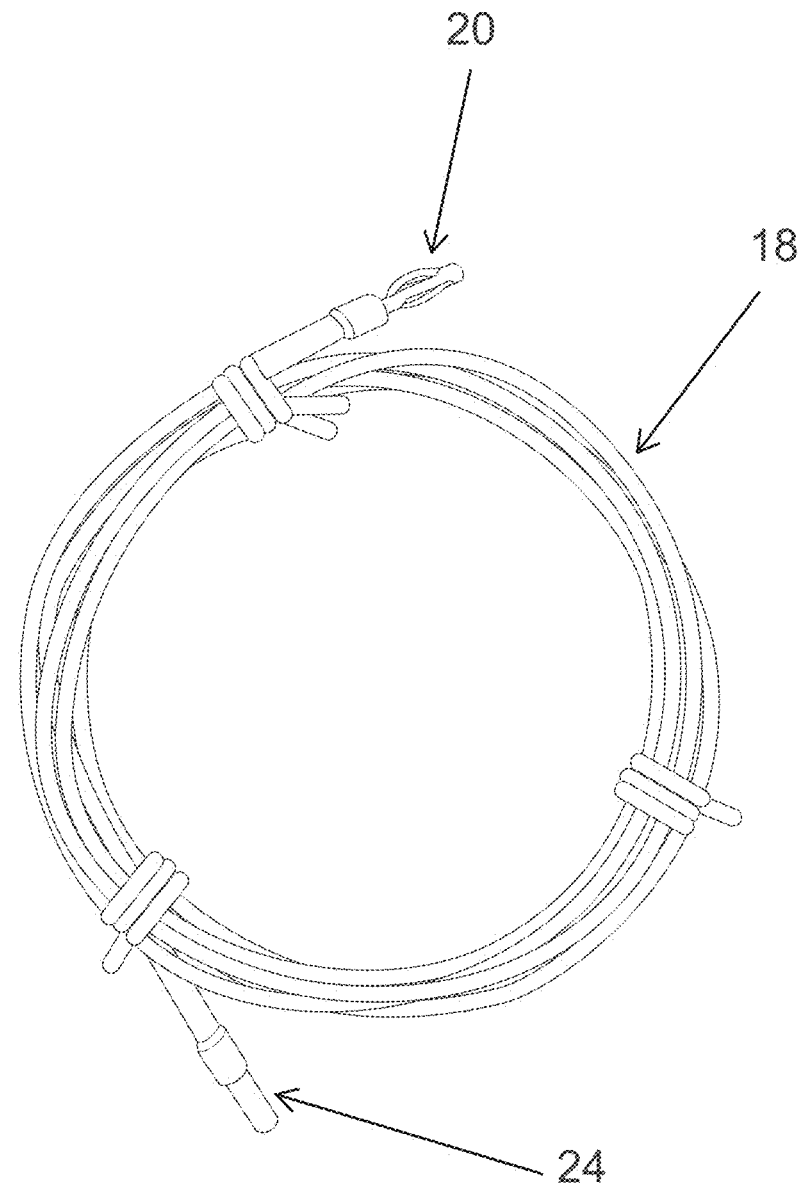
FIG. 9 is a top view of a component according to an embodiment of the present disclosure.

Referring now to FIG. 9, a length of wire 18 is shown with a male connector 20 on one end and a female connector 24 on the opposite end.

Figure 10:
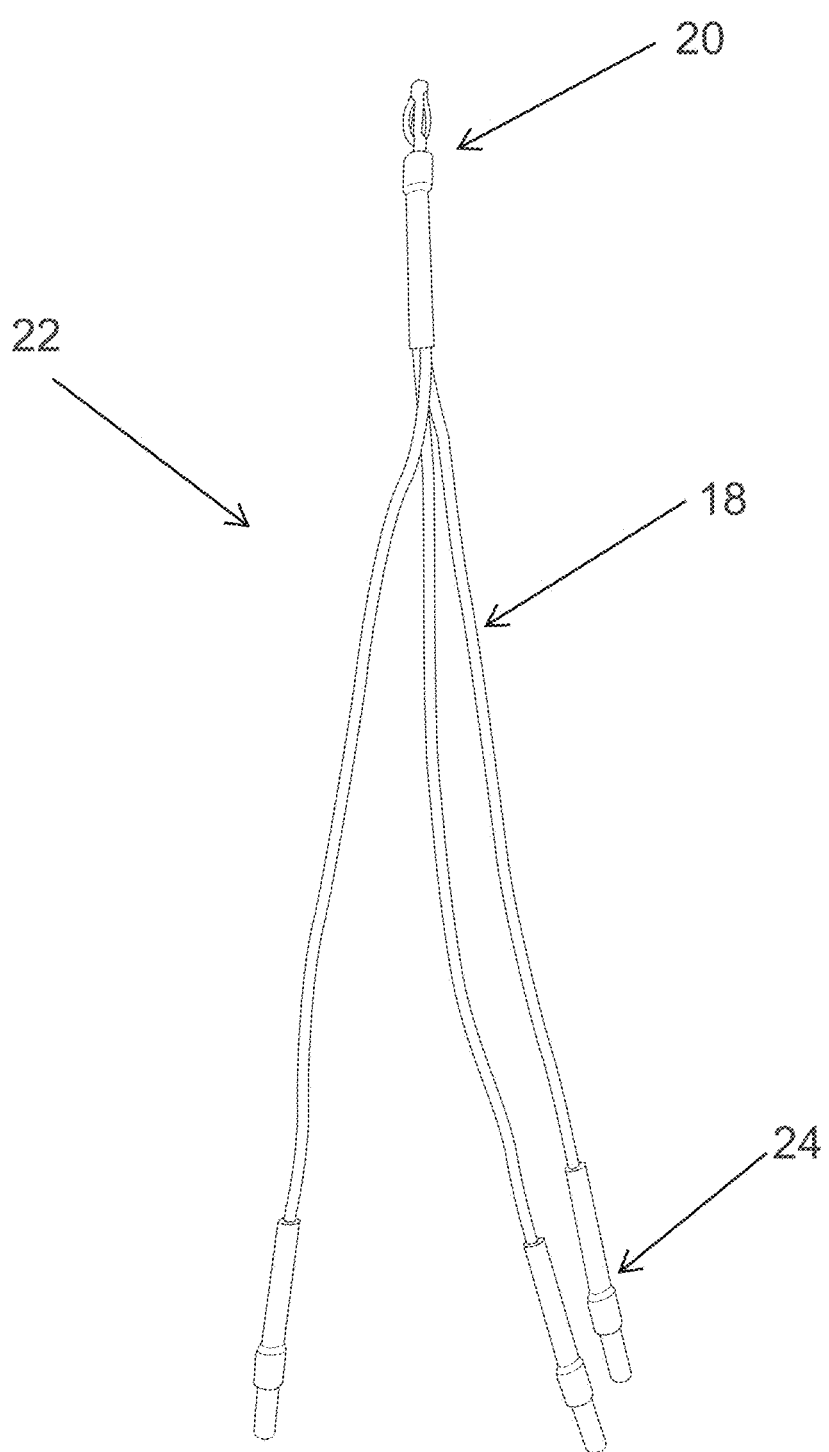
FIG. 10 is a top view of a component according to an embodiment of the present disclosure.

Referring now to FIG. 10, a multi-tap connector 22 is shown with a male connector 20 on one end, joining a plurality of wires 18, each end terminated with a female connector 24. It should be understood that male and female connectors 20 and 24 may be used interchangeably throughout the system 10.

Figure 11:
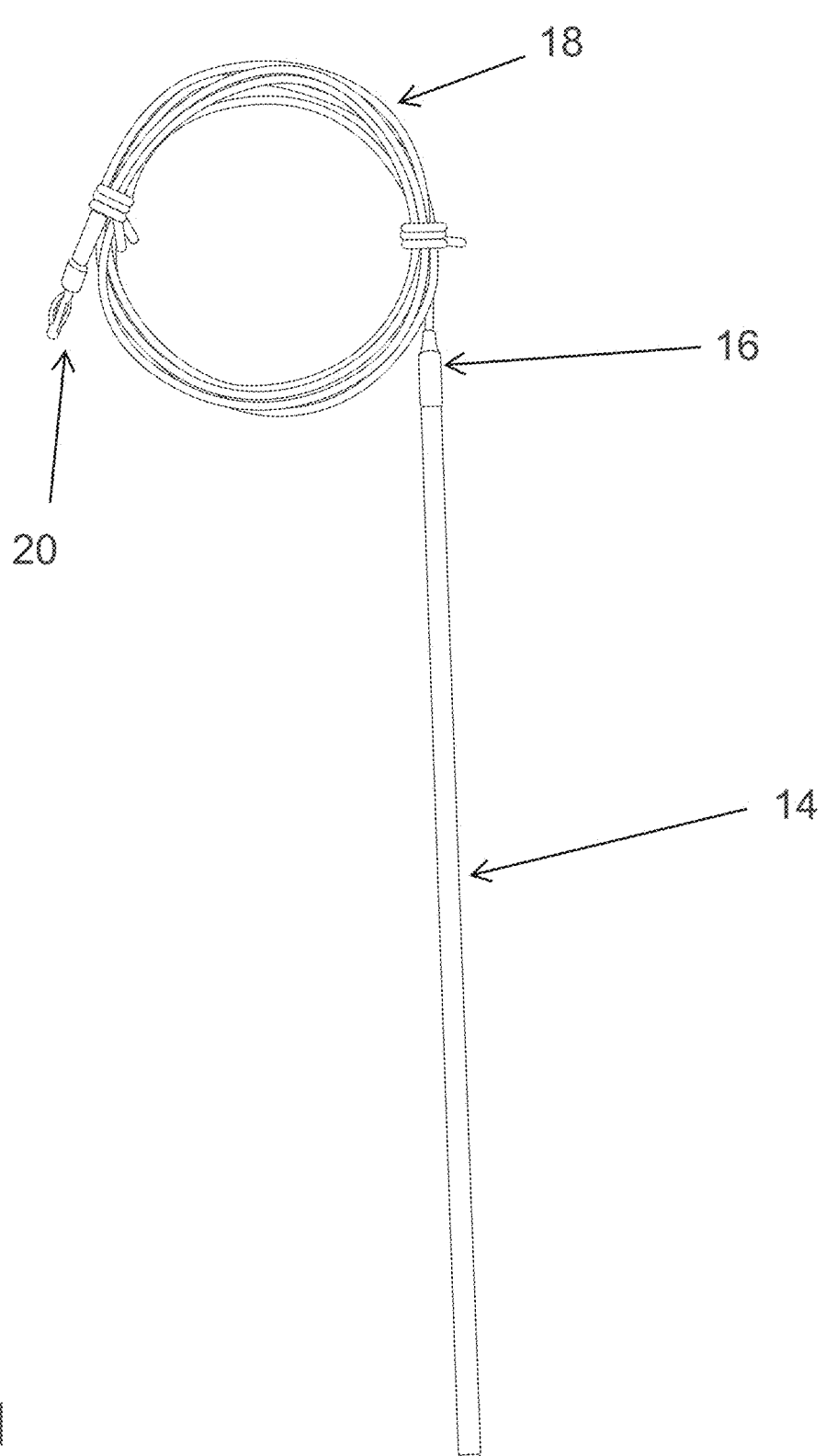
FIG. 11 is a top view of a component according to an embodiment of the present disclosure.

Referring now to FIG. 11, a conductive rod 14 of variable length is shown joined to wire 18 by wire connector 16. The opposite end of wire 18 is terminated with, in this embodiment, male connector 20.

Figure 12:
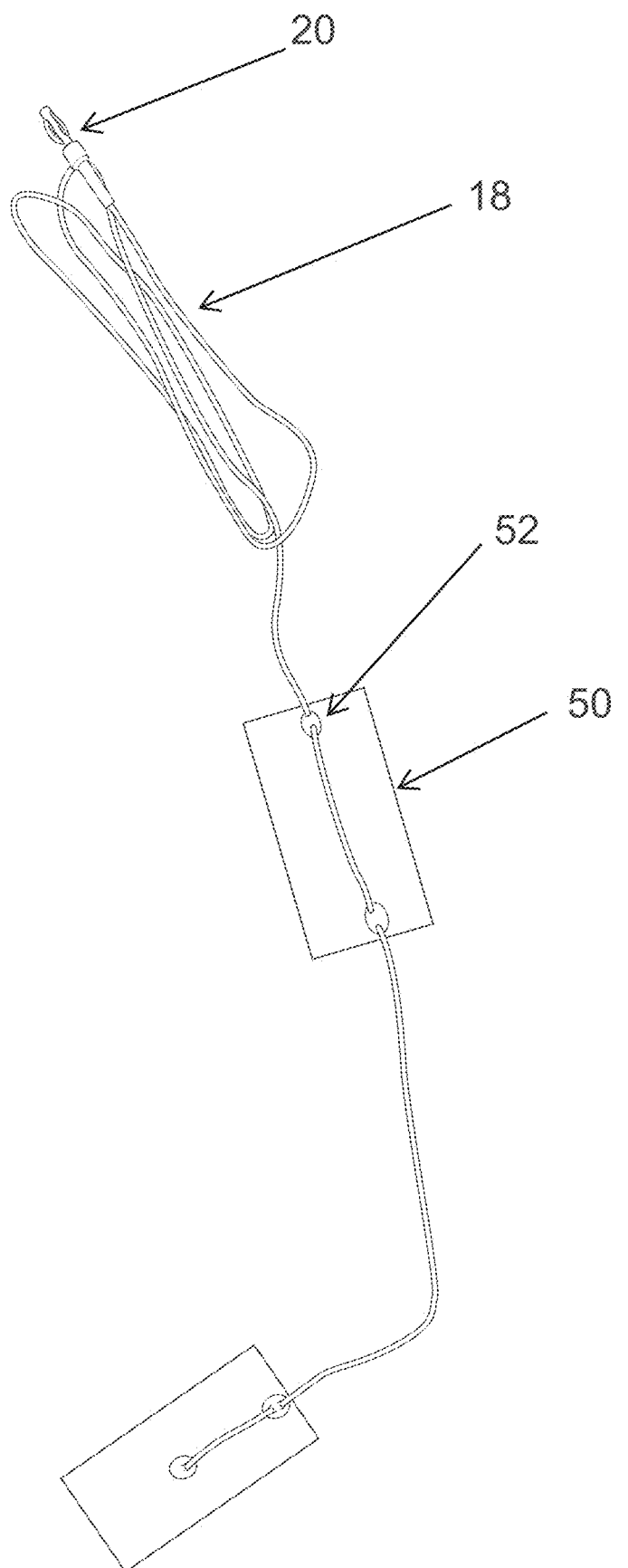
FIG. 12 is a top view of a component according to an embodiment of the present disclosure.

Referring now to FIG. 12, a pair of conductive plates 50 are shown, joined by sections of wire 18 by solder connections 52. The opposite end of wire 18 is terminated by male connector 20.

Figure 13:
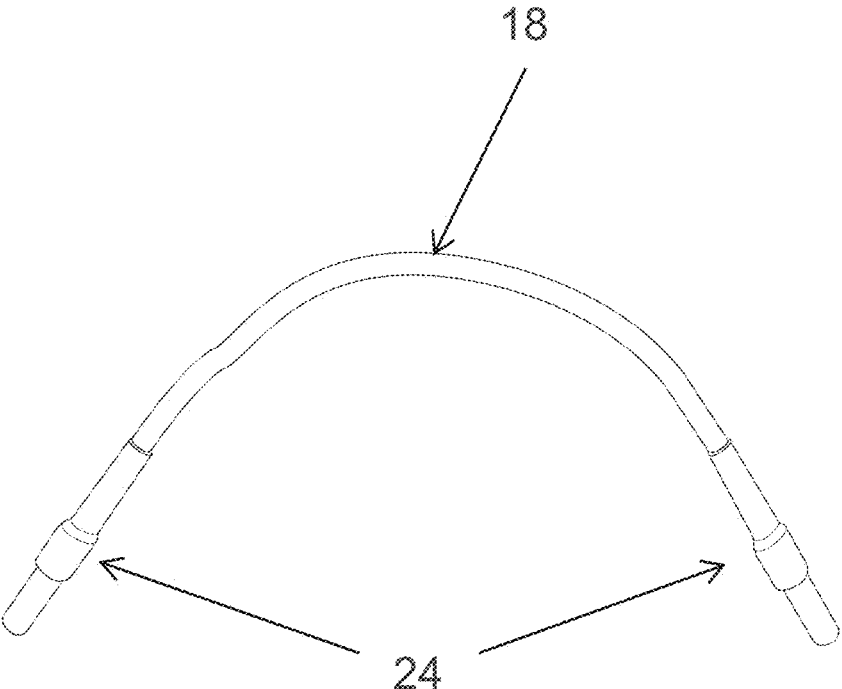
FIG. 13 is a top view of a component according to an embodiment of the present disclosure.

Referring now to FIG. 13, is a length of wire 18 terminated on either end, in this embodiment, by female connectors 24.

Referring now to FIGS. 14 and 15, an outlet adapter is shown, including a female receiver electrically connected via outlet adapter body 34 to conductive outlet connection 38. A pair of non-conductive outlet guides 36 are also shown to engage a NEMA three-prong outlet.

Figure 16:
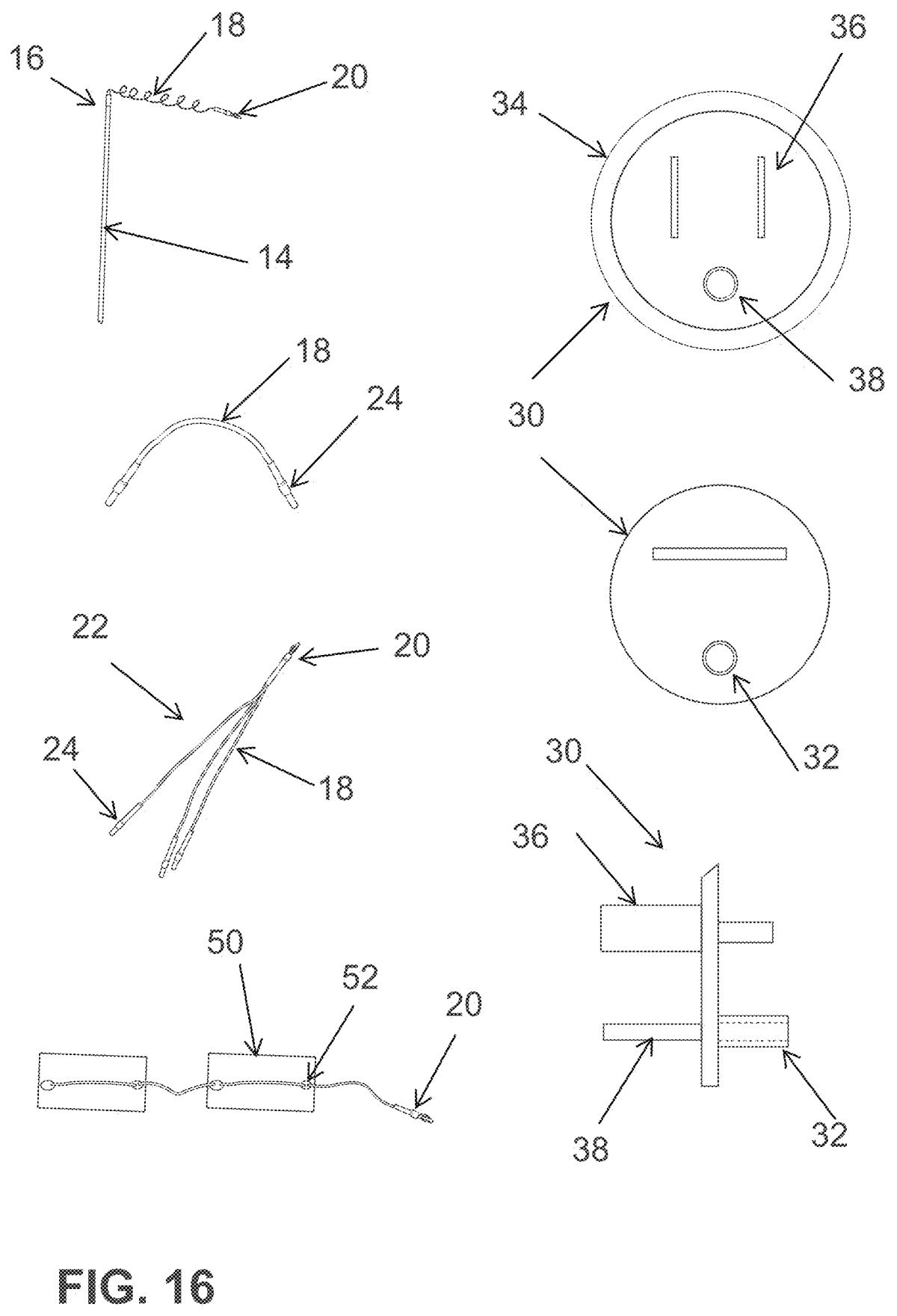

Referring now to FIG. 16, components of the system 10 are shown. On the top left side a conductive rod 14 is shown, connected to the wire 18 with wire connection 16. The wire

18 is terminated with a male connector 20. A length of wire 18 is shown below, terminated on either end by female connectors 24. A multi-tap connector 22 is shown below, with a plurality of wires 18, each with a female connector 24 joined together by male connector 20. A pair of conductive plates 50 are shown joined to wire 18 with solder connections 52. The wire is terminated with a male connector 20. On the right side several views of the outlet adapter 30 are shown, including the female receiver 32, the outlet adapter body 34, the non-conductive outlet guides 36, and the conductive outlet connection 38.

The preceding examples illustrate embodiments of the disclosure, but should not be viewed as limiting the scope of the disclosure.

Other embodiments and uses of the disclosure will be apparent to those skilled in the art from consideration of the specification and practice of the disclosure as disclosed herein. All references cited herein, including all publications, U.S. and foreign patents and patent applications, are specifically and entirely incorporated by reference. The term comprising, wherever used, is intended to include the terms consisting and consisting essentially of. Furthermore, the terms comprising, including, and containing are not intended to be limiting. It is intended that the specification and examples be considered exemplary only with the true scope and spirit of the disclosure indicated by the following claims.

The invention claimed is:

1. A system to connect a potted plant to ground potential, the system comprising:
   a conductive rod, wherein the conductive rod is placed in soil surrounding a plant in a non-conductive pot;
   a wire having a first end electrically connected on a first end to the conductive rod and a second end electrically connected to an electrical outlet adapter;
   wherein the electrical outlet adapter is configured to be selectively engaged with only a ground contact of an electrical outlet,
   wherein engagement of the electrical outlet adapter with the ground contact electrically couples the wire and the conductive rod to the outlet's ground potential.

2. The system of claim 1, wherein the conductive rod comprises copper, aluminum, or an alloy thereof.

3. The system of claim 1, wherein the conductive rod includes a detachable electrical connector selectively connectable to the wire, the connector being a detachable plug-and-socket connector.

4. The system of claim 1, wherein the wire includes connectors on the first end and the second end that are selectively connectable to the conductive rod and the electrical outlet adapter, the connectors being detachable plug-and-socket connectors.

5. The system of claim 1, wherein the electrical outlet adapter includes a first receptacle for receiving the wire, wherein the first receptacle is electrically connected to a conductive ground connection of the electrical outlet adapter that is configured to engage a ground contact of the electrical outlet.

6. The system of claim 5, further comprising a pair of non-conductive outlet guides configured to physically occupy respective neutral and hot receptacle slots of the electrical outlet to prevent electrical engagement with the neutral and hot terminals.

7. The system of claim 1, further including a multi-tap connector, wherein the multi-tap connector joins a plurality of conductive rods with a single electrical connection to the electrical outlet adapter, the multi-tap connector comprising a plurality of detachable wire taps.

8. A system to connect a potted plant to ground potential, the system comprising:

at least one conductive plate, wherein the at least one conductive plate is placed in soil surrounding a plant in a non-conductive pot;

a wire electrically connected on a first end to the at least one conductive plate and on a second end to an electrical outlet adapter;

wherein the electrical outlet adapter is configured to be selectively engaged with only a ground contact of an electrical outlet;

wherein engagement of the electrical outlet adapter with the ground contact electrically couples the wire and the at least one conductive plate to the outlet's ground potential.

9. The system of claim 8, wherein the at least one conductive plate comprises copper, aluminum, or an alloy thereof.

10. The system of claim 8, wherein the at least one conductive plate is electrically connected to a wire using a low-temperature fusible metal alloy at a plate-to-wire joint to form a mechanically secure and electrically conductive, field-serviceable connection.

11. The system of claim 8, wherein the wire includes connectors on the first end and the second end that are selectively connectable to the at least one conductive plate and the electrical outlet adapter, the connectors being detachable plug-and-socket connectors.

12. The system of claim 8, wherein the electrical outlet adapter includes a first receptacle for receiving the wire, wherein the first receptacle is electrically connected to a conductive ground connection of the electrical outlet adapter that is configured to engage a ground contact of the electrical outlet.

13. The system of claim 12, further comprising a pair of non-conductive outlet guides configured to physically occupy respective neutral and hot receptacle slots of the electrical outlet to prevent electrical engagement with the neutral and hot terminals.

14. The system of claim 8, further including a multi-tap connector, wherein the multi-tap connector joins a plurality of conductive plates with a single electrical connection to the electrical outlet adapter, the multi-tap connector comprising a plurality of detachable wire taps.

15. A system to connect a plurality of potted plants to ground potential, the system comprising:

a conductive rod, wherein the conductive rod is placed in the earth;

an electrical connector, wherein the electrical connector joins a plurality of wires in electrical communication with the conductive rod;

a first wire of the plurality of wires in electrical connection with a plurality of conductive plates, wherein the conductive plates are disposed in the soil of a first potted plant;

a multi-tap connector, wherein the multi-tap connector is electrically connected to the conductive rod by the electrical connector, and wherein the multi-tap connector further comprises a plurality of wire taps, wherein the wire taps are electrically connected to a plurality of sets of conductive plates disposed in the soil of a second and a third potted plant by a second wire of the plurality of wires and a third wire of the plurality of wires.

16. The system of claim 15, wherein each of the conductive plates is comprised of copper, aluminum, or an alloy thereof.

17. The system of claim 15, wherein each plate-to-wire joint electrically connects a respective conductive plate to a respective wire using a low-temperature fusible metal alloy to provide a mechanically secure and electrically conductive, field-serviceable connection.

18. The system of claim 15, wherein each wire includes connectors on the first end and the second end that are selectively connectable to the conductive rod, the multi-tap connector, and the electrical outlet adapter, the connectors being detachable plug-and-socket connectors.

19. The system of claim 15, wherein the second wire and the third wire include selectively detachable connectors that engage corresponding selectively detachable connectors on the multi-tap connector, respectively.

20. The system of claim 15, wherein the first, second, and third wires include an insulated covering along at least a portion of the lengths of the first, second, and third wires.

* * * * *